United States Patent
Sambhwani et al.

(10) Patent No.: US 8,706,123 B2
(45) Date of Patent: Apr. 22, 2014

(54) COMMON DATA CHANNEL RESOURCE USAGE REPORT

(75) Inventors: Sharad Deepak Sambhwani, San Diego, CA (US); Wei Zhang, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 12/407,177

(22) Filed: Mar. 19, 2009

(65) Prior Publication Data

US 2009/0238090 A1 Sep. 24, 2009

Related U.S. Application Data

(60) Provisional application No. 61/039,044, filed on Mar. 24, 2008, provisional application No. 61/050,314, filed on May 5, 2008, provisional application No. 61/088,456, filed on Aug. 13, 2008, provisional application No. 61/092,346, filed on Aug. 27, 2008.

(51) Int. Cl.
*H04W 72/04* (2009.01)

(52) U.S. Cl.
USPC .......................... 455/450; 370/252; 370/329

(58) Field of Classification Search
USPC ............. 455/452.1, 452.2; 370/252, 328, 329
See application file for complete search history.

(56) References Cited

U.S. PATENT DOCUMENTS 7,317,700 B2    1/2008   Hwang
(Continued)

FOREIGN PATENT DOCUMENTS

| CN | 1666560 A | 9/2005 |
|---|---|---|
| CN | 1917661 A | 2/2007 |

(Continued)

OTHER PUBLICATIONS

"3rd Generation Partnership Project;Technical Specification Group Radio Access Network;1.28 Mcps TDD Enhanced Uplink: UTRAN Iub/Iur Protocol Aspects (Release 7)" 3GPP Draft; R3-071107 (TR R3.019 V1.0.0)—Clear, 3rd Generation Partnership Project (3GPP), Mobile Competence Centre; 650, Route Des Lucioles ; F-06921 Sophia-Antipolis Cedex; France,voll.*

(Continued)

*Primary Examiner* — Sharad Rampuria
*Assistant Examiner* — Khawar Iqbal
(74) *Attorney, Agent, or Firm* — Darren M. Simon

(57) ABSTRACT

Systems and methodologies are described that facilitate indicating channel resource usage information for receiving additional channel resources in a wireless network. An access point can initially receive a set of channel resources from a network controller for providing wireless network access to one or more devices. The access point can grant and/or deny requests for one or more of the channel resources from a plurality of devices and can feedback information to the network controller regarding the granting/denying. The network controller can determine a load on the access point based at least in part on the feedback information and adjust channel resource allocation based on the load. Thus, where an access point has granted close to capacity of allocated resources to one or more devices, the network controller can provide additional resources to the access point based on received feedback information related to the granted resources.

35 Claims, 11 Drawing Sheets

(56) References Cited

U.S. PATENT DOCUMENTS

| | | | |
|---|---|---|---|
| 7,839,883 B2 * | 11/2010 | Dan et al. | 370/439 |
| 7,894,338 B2 * | 2/2011 | Ljung et al. | 370/230 |
| 7,986,660 B2 | 7/2011 | Ramos et al. | |
| 8,000,289 B2 | 8/2011 | Nobukiyo et al. | |
| 8,089,888 B2 | 1/2012 | Krishnamurthi et al. | |
| 2003/0095538 A1 | 5/2003 | Kayama et al. | |
| 2004/0185862 A1 | 9/2004 | Terry et al. | |
| 2005/0239460 A1 * | 10/2005 | Kroth et al. | 455/434 |
| 2007/0281708 A1 * | 12/2007 | Bakhuizen et al. | 455/450 |
| 2008/0075036 A1 * | 3/2008 | Bertrand et al. | 370/328 |
| 2009/0116435 A1 * | 5/2009 | Koorapaty et al. | 370/329 |
| 2009/0143074 A1 * | 6/2009 | Pelletier et al. | 455/452.2 |
| 2009/0196230 A1 * | 8/2009 | Kim et al. | 370/328 |
| 2009/0247161 A1 * | 10/2009 | Pani et al. | 455/435.3 |
| 2010/0017506 A1 * | 1/2010 | Fadell | 709/224 |
| 2011/0096677 A1 * | 4/2011 | Kim | 370/252 |
| 2012/0170553 A1 * | 7/2012 | Lindheimer et al. | 370/335 |

FOREIGN PATENT DOCUMENTS

| | | | |
|---|---|---|---|
| CN | 101128016 A | | 2/2008 |
| EP | 1448012 A2 | * | 8/2004 |
| EP | 1448012 A2 | | 8/2004 |
| EP | 1838003 A2 | | 9/2007 |
| JP | 2004242227 A | | 8/2004 |
| RU | 2208913 | | 7/2003 |
| RU | 2260923 | | 9/2005 |
| RU | 2310999 | | 11/2007 |
| WO | 0158054 A1 | | 8/2001 |
| WO | 0232173 A1 | | 4/2002 |
| WO | 03051076 | | 6/2003 |
| WO | 2005112487 A2 | | 11/2005 |
| WO | 2006052208 A1 | | 5/2006 |

OTHER PUBLICATIONS

"3rd Generation Partnership Project;Technical Specification Group Radio Access Network;1.28 Mcps TDD Enhanced Uplink: UTRAN Iub/Iur Protocol Aspects (Release 7)" 3GPP Draft; R3-071107 (TR R3.019 V1.0.0)—Clear, 3rd Generation Partnership Project (3GPP), Mobile Competence Centre; 650, Route Des Lucioles ; F-06921 Sophia-Antipolis Cedex; France, vol. RAN WG3, no. Kobe, Japan; May 7, 2007, May 10, 2007, XP050161974 p. 6-p. 9 figures 1,2.

International Search Report & Written Opinion—PCT/US2009/037974, International Search Authority—European Patent Office—Jun. 23, 2009.

Nokia: "Resource assignment for E-DCH access in CELL_FACH state". Internet Citation, [Online] XP002467707 Retrieved from the Internet: URL:http://www.3gpp.org/ftp/tsg_ran/WG1_RL1/TSGR1_50b/Docs> [retrieved on Feb. 6, 2008] paragraphs [0002], [0003].

QUALCOMM Europe: "Common E-DCH resource usage report" 3GPP Draft; R3-080733 Common E-DCH Resource Usage Report, 3rd Generation Partnership Project (3GPP), Mobile Competence Centre ; 650, Route Des Lucioles; F-06921 Sophia-Antipolis Cedex; France, vol. RAN WGS, no. Shenzhen, China; 20080403, Mar. 25, 2008, XP050163947 the whole document.

Nokia Corporation, et al: "Resource assignment for E-DCH access in CELL_FACH state," 3GPP Draft; R2-074626 Resource Assignment, 3rd Generation Partnership Project (3GPP), Mobile Competence Centre; 650 Route Des Lucioles; F-06921 Sophia-Antipolis Cedex; France, vol. tsg_ran\WG2-RL2\TSGR2_60\Docs, no. Jeju; (Nov. 12, 2007), XP050137159.

Taiwan Search Report—TW098109592—TIPO—Jul. 16, 2012.

* cited by examiner

COMMON DATA CHANNEL RESOURCE USAGE REPORT

CROSS-REFERENCE TO RELATED APPLICATIONS

This application claims the benefit of U.S. Provisional Patent application Ser. No. 61/039,044 entitled "COMMON E-DCH RESOURCE USAGE REPORT" which was filed Mar. 24, 2008, U.S. Provisional Patent application Ser. No. 61/050,314 entitled "COMMON E-DCH RESOURCE USAGE REPORT" which was filed May 5, 2008, U.S. Provisional Patent application Ser. No. 61/088,456 entitled "COMMON E-DCH RESOURCE USAGE REPORT" which was filed Aug. 13, 2008, and U.S. Provisional Patent application Ser. No. 61/092,346 entitled "APPARATUS AND METHOD FOR MEASURING RESOURCE USAGE PARAMETERS AND GENERATING RESOURCE USAGE PARAMETERS" which was filed Aug. 27, 2008. The entireties of the aforementioned applications are herein incorporated by reference.

BACKGROUND

I. Field

The following description relates generally to wireless communications, and more particularly to providing upstream channel resource usage reporting.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as high speed packet access (HSPA), third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (such as base stations, relay stations, other mobile devices using peer-to-peer or ad hoc technologies, etc.), via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth.

The access points can correspond to a network controller that facilitates communication with an underlying wireless network and allocates resources to the access points for providing wireless network access to the mobile devices. In an HSPA configuration, for example, the access points can communicate with a radio network controller that provides enhanced dedicated channel (E-DCH) and/or enhanced uplink (EUL) resources to the access points. The access points can, in turn, allocate a portion of the E-DCH/EUL resources for mobile devices to utilize in generating a system acquisition request or send other data/signaling messages. In this regard, the mobile devices can request the resources over a shared access channel, and the access points can grant or deny the request for E-DCH/EUL resources based on a number of factors.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating providing data channel resource usage information to receive additional resources for allocation. For example, an access point can receive data channel resources from a network controller for allocation to one or more mobile devices requesting access to an underlying wireless network. The access point can grant or deny resources to a plurality of mobile devices based on loading, interference, mobile device type, available resources, and/or the like. The access point can report to the network controller regarding a number of data channel resources granted and/or denied to the mobile devices, which the network controller can utilize to determine whether to allocate additional data channel resources to the access point. Additionally or alternatively, a number of transmissions over the data channels in a time period, the average amount of time a mobile device has held a data channel resource, an average noise rise resulting from the data channels, and/or the like can be measured and reported to the network controller for allocating additional resources, for example.

According to related aspects, a method for reporting channel usage information to a network controller is provided. The method includes receiving a set of data channel resources from a network controller related to accessing a wireless network. The method also includes allocating one or more of the data channel resources to one or more devices to facilitate accessing the wireless network and determining usage information related to the set of data channel resources.

Another aspect relates to a wireless communications apparatus. The wireless communications apparatus can include at least one processor configured to receive a set of data channel resources from a network controller for accessing a wireless network. The processor is further configured to provide a portion of the set of data channel resources to one or more devices to facilitate accessing the wireless network and report channel usage information related to the portion of the set of data channel resources to the network controller. The wireless communications apparatus also comprises a memory coupled to the at least one processor.

Yet another aspect relates to a wireless communications apparatus that facilitates reporting data channel usage information. The wireless communications apparatus can comprise means for receiving a plurality of data channel resources from a network controller and means for allocating a set of the plurality of data channel resources to one or more devices for accessing a wireless network. The wireless communications apparatus can additionally include means for generating data channel usage information related to the allocated set of the plurality of data channel resources.

Still another aspect relates to a computer program product, which can have a computer-readable medium including code for causing at least one computer to receive a set of data channel resources from a network controller related to accessing a wireless network. The computer-readable medium can also comprise code for causing the at least one computer to allocate one or more of the data channel resources to one or more devices to facilitate accessing the wireless network. Moreover, the computer-readable medium can comprise code for causing the at least one computer to generate usage information related to the set of data channel resources.

Moreover, an additional aspect relates to an apparatus. The apparatus can include an acquisition request component that receives system acquisition requests from one or more devices in a wireless network and a channel allocation component that provides one or more data channel resources received from a network controller to the one or more devices based on the system acquisition requests. The apparatus can further include a channel allocation reporting component that generates channel usage information based at least in part on the data channel resources received from the network controller.

According to a further aspect, a method that facilitates allocating channel resources to access points in a wireless communications network is provided. The method includes allocating a set of data channel resources, for providing access to a wireless network, to an access point as well as receiving usage information from the access point related to the set of data channel resources. The method also includes adjusting allocation of the set of data channel resources to the access point based at least in part on the usage information.

Another aspect relates to a wireless communications apparatus. The wireless communications apparatus can include at least one processor configured to provide a plurality of data channel resources to one or more access points to facilitate providing access to a wireless network. The processor is further configured to receive usage information related to one or more of the data channel resources granted to one or more devices by the one or more access points and provide additional data channel resources to the one or more access points based at least in part on the usage information. The wireless communications apparatus also comprises a memory coupled to the at least one processor.

Yet another aspect relates to a wireless communications apparatus that allocates data channel resources based on related usage information. The wireless communications apparatus can comprise means for providing a set of data channel resources to an access point for providing access to a wireless network. The wireless communications apparatus can additionally include means for receiving a data channel resource usage report from the access point, wherein the means for providing allocates additional data channel resources to the access point based at least in part on the data channel resource usage report.

Still another aspect relates to a computer program product, which can have a computer-readable medium including code for causing at least one computer to allocate a set of data channel resources, for providing access to a wireless network, to an access point. The computer-readable medium can also comprise code for causing the at least one computer to receive usage information from the access point related to the set of data channel resources. Moreover, the computer-readable medium can comprise code for causing the at least one computer to adjust allocation of the set of data channel resources to the access point based at least in part on the usage information.

Moreover, an additional aspect relates to an apparatus. The apparatus can include an allocation adjustment component that allocates a plurality of data channel resources to an access point. The apparatus can further include a report receiving component that obtains usage information related to a number of the plurality of data channel resources granted to devices in a wireless network by the access point, wherein the allocation adjustment component modifies allocation of the plurality of data channel resources to the access point based on the usage information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
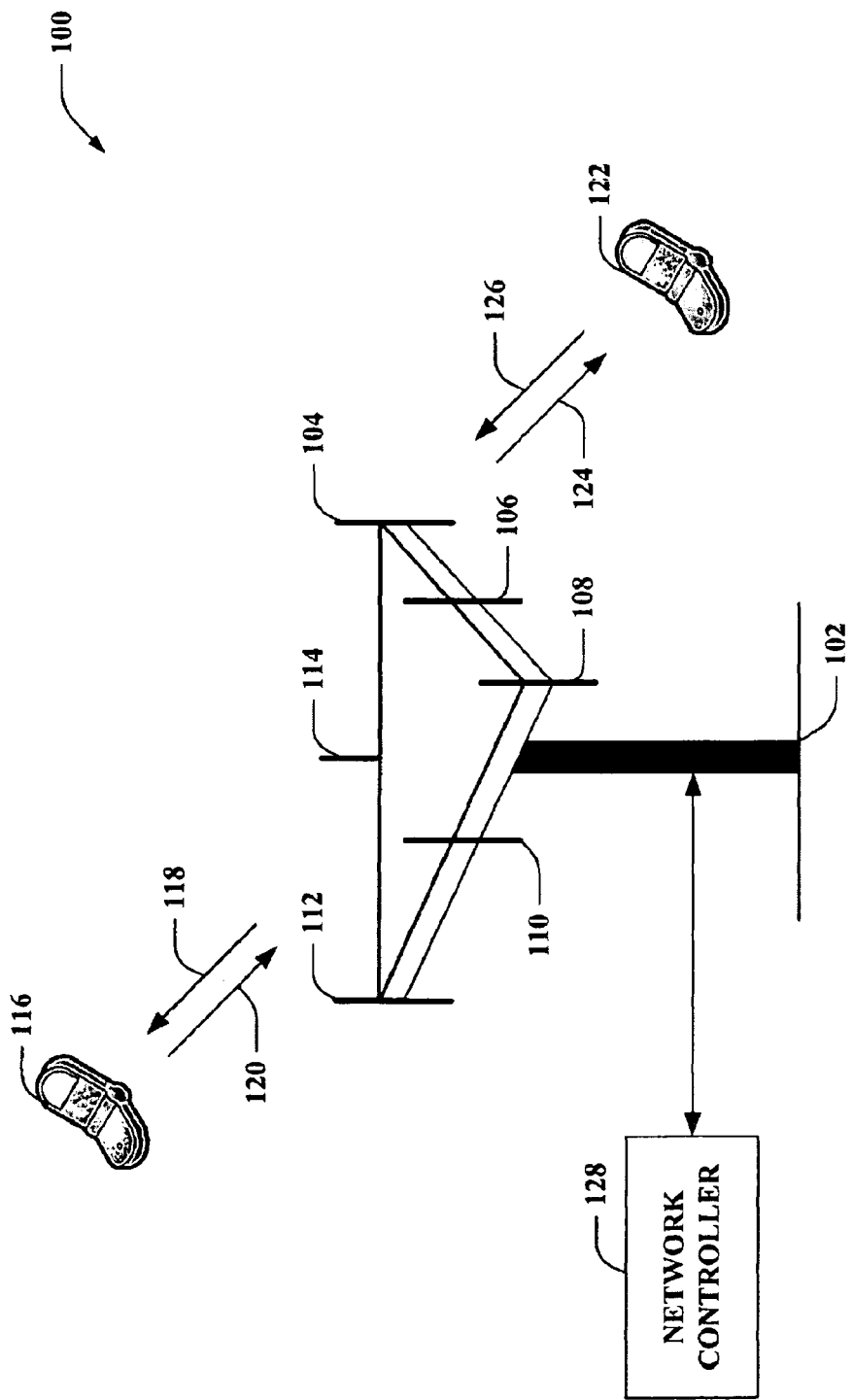
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in related protocols, such as high speed packet access (HSPA), various embodiments thereof, and/or the like. The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g. forward link, reverse link, . . . ) such as FDD, FDM, TDD, TDM, CDM, and the like. Furthermore, the system 100 can utilize a HSPA or similar protocol, in one example. The base station 102 can be communicatively coupled to a network controller 128 that provides allocable data channel resources for communicating with a wireless network to base station 102 and/or one or more disparate base stations (not shown). The base station 102 can accordingly allocate the data channel resource to the mobile devices 116 and/or 122. In addition, the base station 102 can feedback data channel usage information to the network controller 128 to allow modification in channel allocation where necessary.

According to an example, the network controller 128 can provide a collection of enhanced dedicated channel (E-DCH) and/or enhanced uplink (EUL) channel resources to the base station 102 (and/or additional base stations), which can be data channels used in HSPA configurations. The base station 102 can implement a random access channel (RACH) that allows mobile devices to request E-DCH/EUL resources from the base station 102 without initially scheduling the request. Upon receiving the request over the RACH from the mobile devices 116 and/or 122, the base station 102 can grant or deny the request; where the request is granted, for example, the base station 102 can, for instance, allocate a portion of the E-DCH/EUL channel resources to the respective mobile device.

In this example, the base station 102 can report E-DCH/EUL channel usage information back to the network controller 128. The information can include, for example, a number of granted E-DCH/EUL channel resources, a number of denied resources, and/or the like. In this regard, the network controller 128 can determine a load on the base station 102 based on the provided information and resource allocation. The network controller 128 can accordingly adjust resources allocated to the base station 102 to ease load. Additionally or alternatively, the information can relate to a number of transmissions over the E-DCH/EUL channels in a time period, the average amount of time a mobile device has held an E-DCH/EUL resource, an average noise rise resulting from the E-DCH/EUL channels, and/or the like. In addition, the base station 102 can report the channel usage information to the network controller 128 on demand, periodically, upon occurrence of an event, and/or the like. In view of the foregoing described examples, channel usage reporting is provided to facilitate channel resource allocation from a network controller to one or more base stations.

Figure 2:
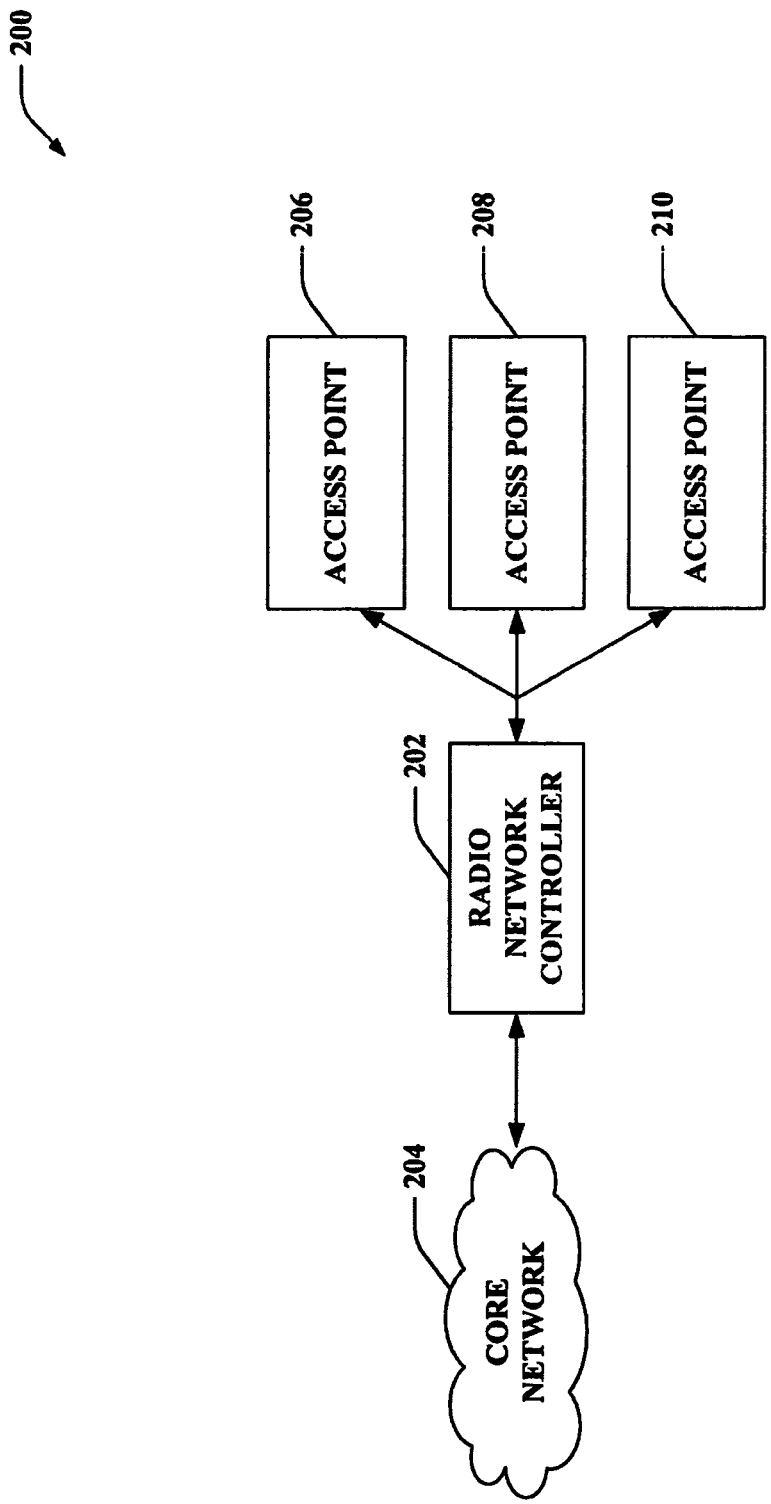
FIG. 2 is an illustration of an example wireless communication network that facilitates allocating data channels to a plurality of access points.

Referring now to FIG. 2, a system 200 that facilitates providing channel resources in a wireless network is shown. The system 200 includes a radio network controller 202 that communicates with a core network 204 and provides resources for communicating with the core network 204 to a plurality of access points 206, 208, and 210. The access points 206, 208, and 210 can, in turn, allocate the resources to a plurality of mobile devices (not shown) for access to the core network 204, as described. In one example, the core network 204 can authenticate/authorize the devices such that the radio network controller 202 and access points 206, 208, and 210 provide a mechanism for communicating between the devices and the network 204.

According to an example, the radio network controller 202 can provide data channel resources to the access points 206, 208, and 210, which can be allocated to mobile devices, as described. In one example, the access points 206, 208, and 210 can implement shared access channels over which the data channel resources can be randomly requested, as described, such as a RACH. Upon receiving requests over the shared access channels, the access points 206, 208, and 210 can grant or deny requests for data channel resources; where a request is granted, the access point 206, 208, and/or 210 can allocate a portion of its data channel resources to a device. It is to be appreciated that where an access point 206, 208, and/or 210 retains a low number of allocable resources, it can desire more resources from the radio network controller 202 to handle additional resource requests.

In this regard, for example, the access points 206, 208, and 210 can report channel usage to the radio network controller 202. This can occur, for example, on demand, upon detection of an event, according to a time interval, and/or the like. Based at least in part on the usage report, the radio network controller 202 can adjust resource allocation to the access points 206, 208, and 210. Such adjusting can include allocating additional unallocated resources to a given access point 206, 208, and/or 210, moving allocated resources among the access points 206, 208, and/or 210 where such an allocation results in improved overall service among the access points, distributed load across the access points, and/or the like, etc.

The access points 206, 208, and 210 can feedback a variety of metrics to the radio network controller 202 that indicate some level of channel resource usage. For example, the access points 206, 208, and 210 can indicate a number of data channel resources granted to devices and/or a number of data channel resource requests denied by the access point; this can be related to a given access frame or otherwise. Using these metrics, the radio network controller 202 can deduce a load level of the respective access point 206, 208, and/or 210. For example, the radio network controller 202 can compare the granted resources to those allocated by the radio network controller 202 to the respective access point.

In another example, the access points 206, 208, and 210 can report a total number of data channel resources blocked in a given period of time, a default data channel resource utilization (e.g., a number of times a default channel resource was blocked in a given period of time), an average transmission arrival rate over the data channel resources over a period of time, an average amount of time a data channel resource was held by an access point, an average noise rise (e.g., rise over thermal (RoT), etc.) due to transmissions over the data channel resources, and/or the like to the radio network controller 202. As described, based on the metrics received, the radio network controller 202 can adjust resource allocation among the access points 206, 208, and 210.

Figure 3:
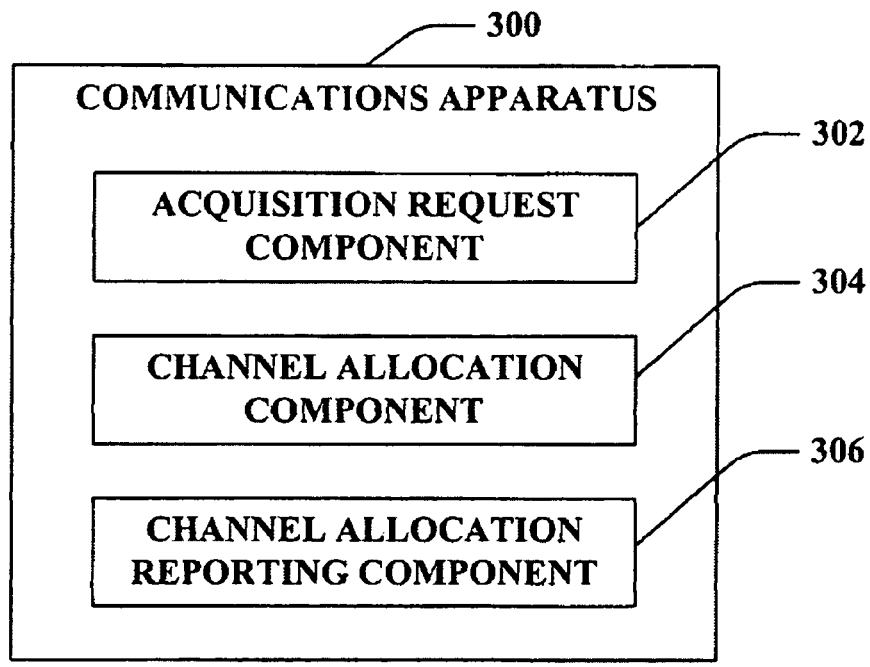
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus that provides access to a wireless network. The communications apparatus 300 can include an acquisition request component 302 that provides a channel for receiving system acquisition requests from one or more devices, a channel allocation component 304 that provides one or more data channel resources to devices based on received system acquisition requests, and a channel allocation reporting component 306 that formulates information regarding data channel resource allocation for subsequent analysis. In one example, the channel allocation reporting component 306 additionally transmits the information to a network controller, as described.

According to an example, the acquisition request component 302 can provide a RACH over which system acquisition requests or data/signaling messages can be received from one or more devices in a wireless network. The acquisition request component 302 can receive such a request from one or more devices moving in-range of the communications apparatus 300, switching from an idle to an active mode, and/or the like, for example. The channel allocation component 304 can determine whether to grant data channel resources in view of the request based on various factors, which can include available resources, available bandwidth, a type of the device, carrier of the device, speed and/or capability of the device, etc. The channel allocation reporting component 306 can evaluate resource grants, denials, etc. and/or transmit related information to a network controller for resource re-allocation, in one example.

In one example, the channel allocation component 304 can provide E-DCH/EUL channel resources to devices upon the acquisition request component 302 receiving a related request over a RACH. In an example, the channel allocation reporting component 306 can report positive acquisition indicators per access frame to a radio network controller using an acquisition indicator channel (AICH) and/or extended AICH (E-AICH) indicators. In the case of E-DCH/EUL resource acquisition, the positive indicator can be transmitted by the channel allocation reporting component 306 using E-AICH even were an E-DCH/EUL resource is denied. In this regard, the radio network controller, without other channel usage information, is not adequately informed of the number of E-DCH/EUL resources actually utilized. Thus, the channel allocation reporting component 306 can additionally report to the radio network controller a number of RACH preambles received at the acquisition request component 302 for which the channel allocation component 304 did not grant E-DCH/EUL resources allowing for improved calculation of utilized resources. The channel allocation reporting component 306, as described, can additionally report the number of E-DCH/EUL resources granted in an access frame on each AICH and/or E-AICH. In addition, as described, the channel allocation reporting component 306 can determine additional or alternative metrics for transmitting to the radio network controller.

Figure 4:
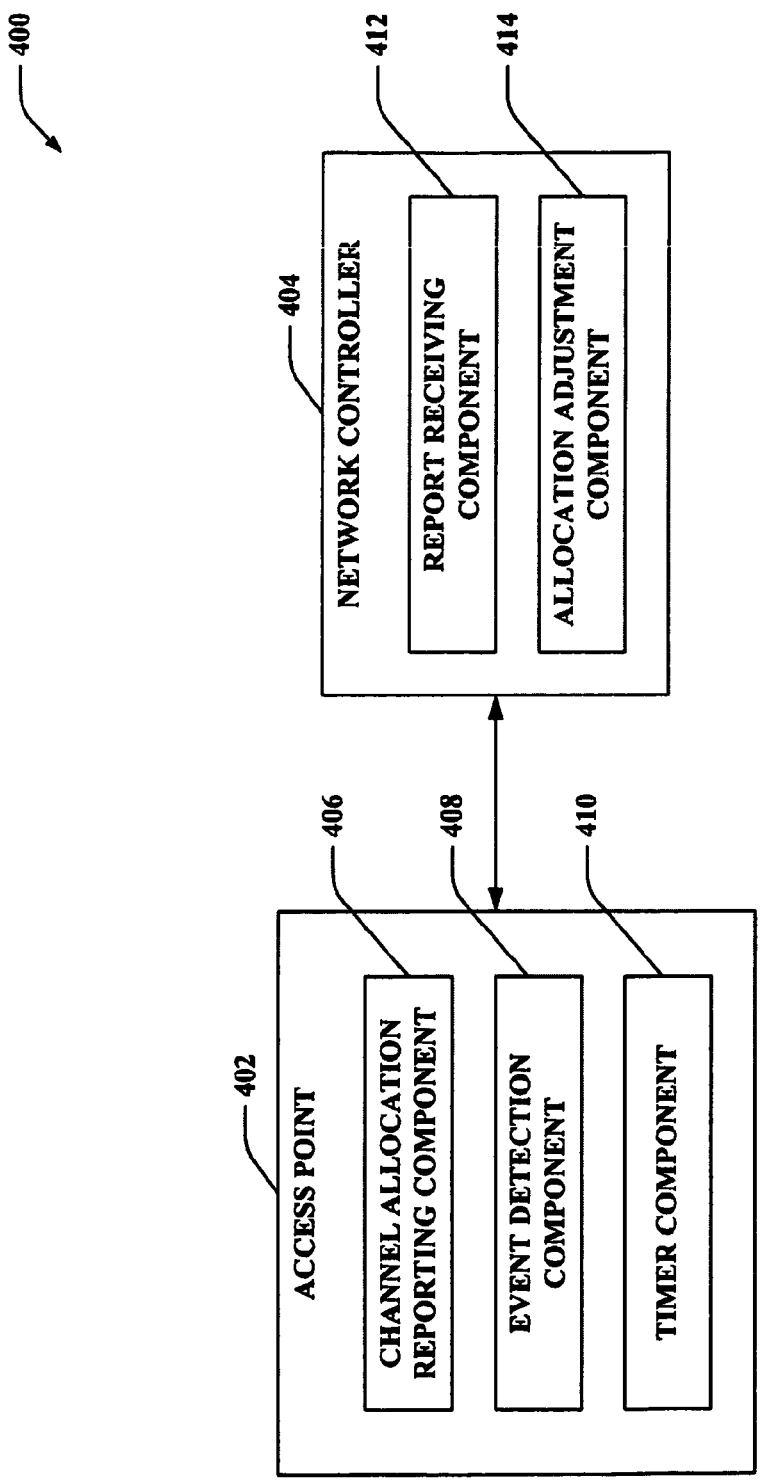
FIG. 4 is an illustration of an example wireless communication system that effectuates allocating channel resources based on usage information.

Now referring to FIG. 4, illustrated is an example wireless communications system 400 that facilitates reporting data channel usage information for resource re-allocation. The wireless communication system 400 includes an access point 402 that can be a base station, femtocell access point, pico, relay and/or the like, that facilitates communication with an underlying wireless network and a network controller 404 that allocates data communication channels to an access point for communicating with the wireless network. It is appreciated that the network controller 404 can support a plurality of access points in the wireless network. In one example, the network controller 404 is co-located at a physical site with the access point 402 and/or one or more disparate access points and connects to a wireless network via a backhaul link.

The access point 402 can comprise a channel allocation reporting component 406 that determines one or more channel allocation metrics and records such to a report and/or transmits the metrics to one or more network components, an event detection component 408 that determines occurrence of an event, and a timer component 410 that executes one or more timers. In one example, the channel allocation reporting component 406 can report channel usage data upon an event occurrence discerned by the event detection component 408, expiration of a timer determined by the timer component 410, and/or the like. The network controller 404 can comprise a report receiving component 412 that obtains a channel usage report as described and an allocation adjustment component 414 that can modify data channel allocation to one or more access points.

According to an example, the allocation adjustment component 414 can determine a number of data channel resources to allocate to the access point 402 and the network controller 404 can so allocate the resources. The access point 402, as described, can provide one or more of the resources to devices requesting access to a wireless network. In one example, access requests can be received over a RACH provided by the access point 402, as described. The channel allocation reporting component 406 can formulate data channel usage information for transmission to the network controller 404. In one example, the event detection component 408 can determine an event occurring at the access point 402, network controller 404, and/or other network component or device that triggers reporting of the channel usage information, and the channel allocation reporting component 406 can accordingly report in view of the detected event. In one example, the event can be a request received from the network controller 404 or other network component, a detected increase of channel resources allocated by the access point 402 over a threshold, and/or the like. In another example, the timer component 410 can execute a timer for reporting channel usage information and notify the channel allocation reporting component 406 upon expiration of the timer. The timer can begin based on a detected event, in one example, or can count over fixed periods of time.

Once the channel allocation reporting component 406 creates a report of channel usage, it can transmit the report to the network controller 404. The report receiving component 412 can obtain and interpret the report, and the allocation adjustment component 414 can determine a modification to the number of data channel resources currently allocated to the access point 402 (and/or one or more disparate access points) based at least in part on the report. The network controller 404 can accordingly effectuate channel allocation modifications. As described, in one example, the channel allocation reporting component 406 can create and transmit to the network controller 404 a report of channel resources granted to various mobile devices in an access frame and/or a number of denied resource requests.

In an example, as described, the channel allocation reporting component 406 can transmit acquisition indicators over an AICH and/or E-AICH to the network controller 404 indicating acquisition granting to one or more devices. Moreover, the channel allocation reporting component 406 can transmit information regarding a number of resources granted per access frame on a given AICH/E-AICH to the network controller 404. It is to be appreciated, however, that in some cases resource denials can be reported as positive acquisition indicators using AICH/E-AICH. Thus, the channel allocation reporting component 406 can additionally transmit a number of denied resource requests received over the RACH. The report receiving component 412 can obtain this information and determine a capacity of the access point 402 given the current channel allocation. For example, the report receiving component 412 can discern a number of channel resources that are granted as indicated in the information as well as how many were initially allocated by the allocation adjustment component 414; this can indicate a current load on the access point 402. In addition, the report receiving component 412 can subtract denied resources that may have been indicated as granted over the AICH/E-AICH to obtain a more accurate number of resources granted. Based on the determined granted resources and/or number of resources allocated to the access point 402, the allocation adjustment component 414 can accordingly modify allocation of resources to the access point 402 and/or among disparate access points to provide resources as needed (e.g. to attain a level of service), a substantially even distribution of resources, resources portioned based on capacity, and/or the like.

In addition, the network controller 404 can specify a maximum transport block size (TBS) for uplink transmission (e.g., over E-DCH/EUL data channel resources) and signal the maximum TBS to the access point 402. This can be part of the initial allocation of resources by the allocation adjustment component 414, subsequent re-allocations, and/or the like. The access point 402 can accordingly allocate resources to devices in view of the maximum TBS and/or specify the TBS to the devices to control interference over the E-DCH/EUL resources. Additionally or alternatively, the network controller 404 can signal a parameter related to a ratio of target of E-DCH/EUL resources allocated to devices against the actual power over the resources. In one example, the access point 402 can utilize this ratio in allocating E-DCH/EUL resource to devices.

In another example, the channel allocation reporting component 406 can determine a total E-DCH/EUL resource utilization based on obtaining the number of times all E-DCH/EUL resources allocated to the access point 402 were granted to devices in a given period of time. Moreover, in one example, the channel allocation reporting component 406 can determine a default E-DCH/EUL resource utilization based at least in part on obtaining a number of times a default E-DCH/EUL was granted in a given period of time. An average E-DCH/EUL arrival rate can also be computed by the channel allocation reporting component 406 based at least in part on determining a number of E-DCH/EUL transmissions in a given period of time. The channel allocation reporting component 406 can additionally determine an average E-DCH/EUL resource service time based on a determined average amount of time an E-DCH/EUL resource was held by the access point 402. Further, an average noise rise or RoT due to E-DCH/EUL transmissions can be discerned by the channel allocation reporting component 406 based at least in part on, for example, a total power caused by E-DCH/EUL transmissions. The channel allocation reporting component 406 can report such metrics to the network controller 404, for example.

The report receiving component 412 can receive such metrics, for example, and utilize the allocation adjustment component 414 to re-allocated E-DCH/EUL resources to the access point 402 (and/or one or more disparate access points) based on the metrics. For example, the total E-DCH resource utilization and/or default resource utilization indicate concrete utilization numbers that directly relate to the access point 402 need for additional resources. The average arrival time, resource service time, and/or noise rise can be utilized to infer whether the access point 402 requires additional resources to effectively support a number of currently connected devices and/or a number of potential devices. For example, the metrics can be compared to desirable thresholds to determine whether additional resources should be allocated to the access point 402, a number of resources to allocate to the access point 402, and/or the like. The report receiving component 412 can dynamically determine such and utilize the allocation adjustment component 414 to accordingly modify resource allocation.

Figure 5:
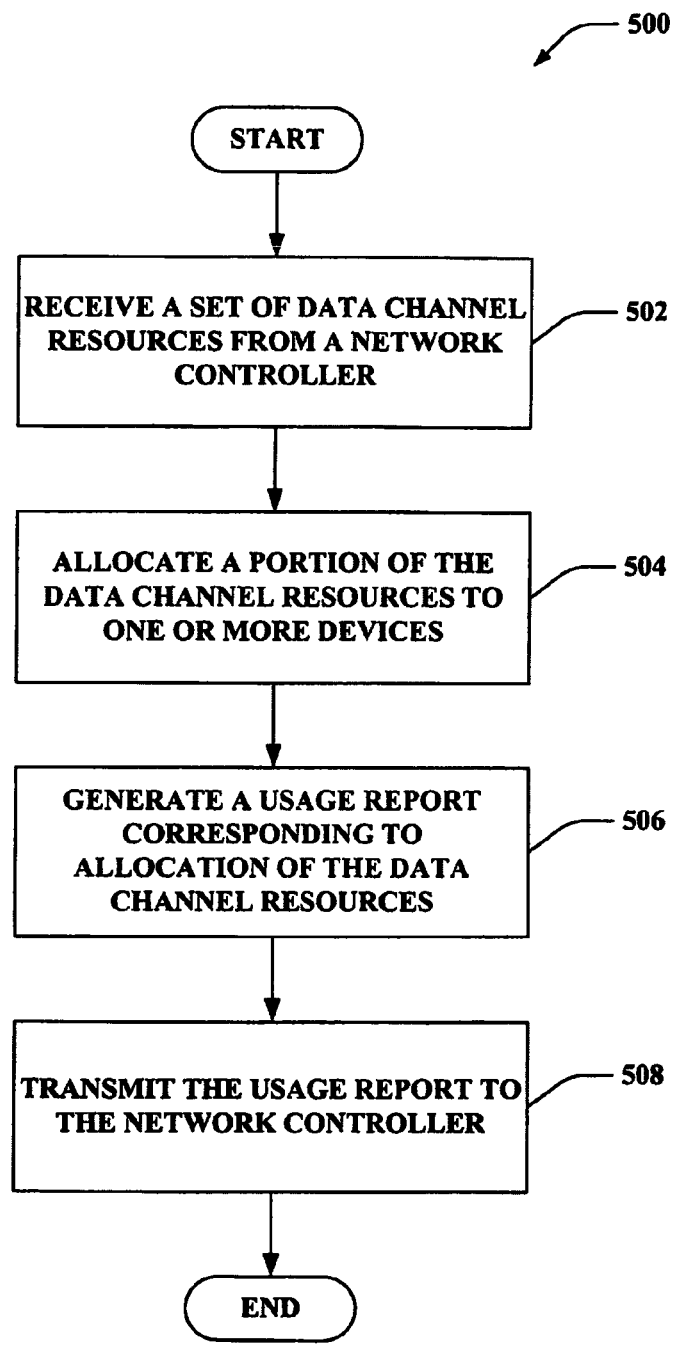
FIG. 5 is an illustration of an example methodology that facilitates transmitting a usage report related to allocated data channels to a network controller.
Figure 6:
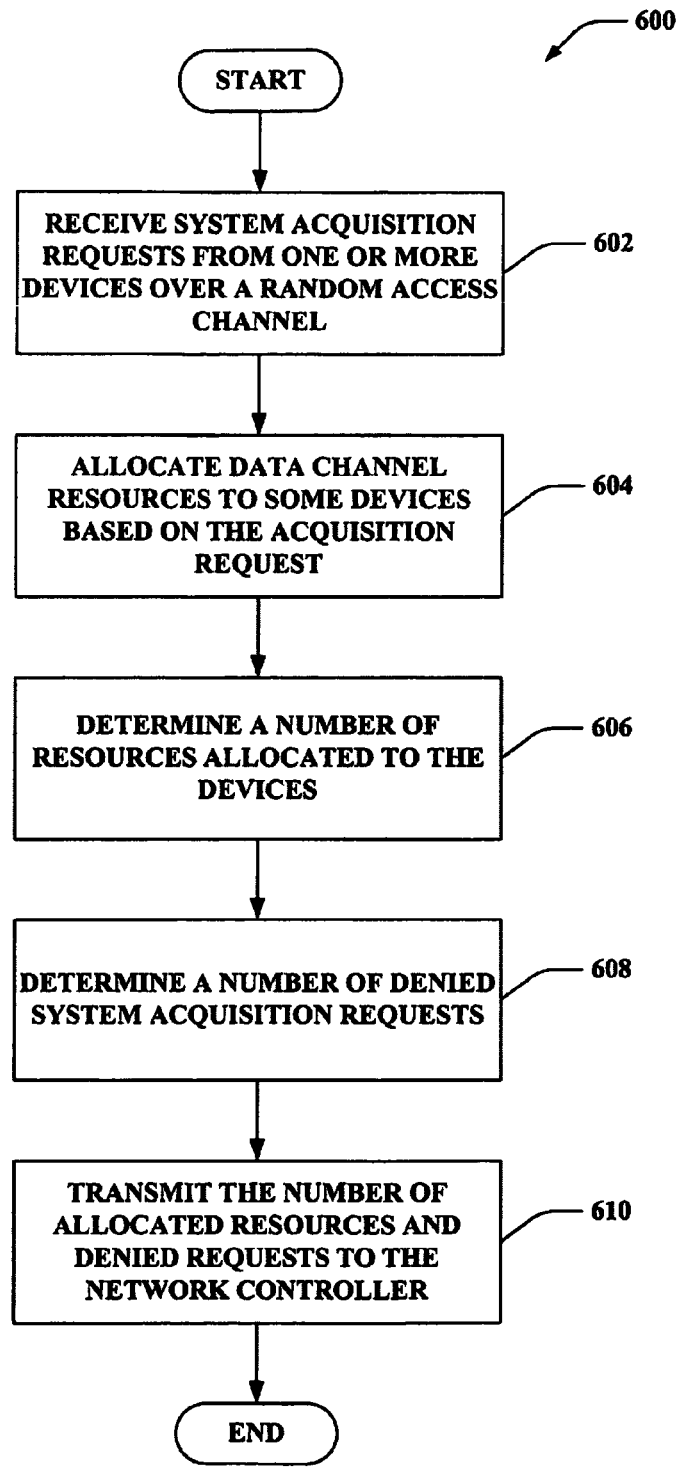
FIG. 6 is an illustration of an example methodology that transmits resource granting/denying information to a network controller.
Figure 7:
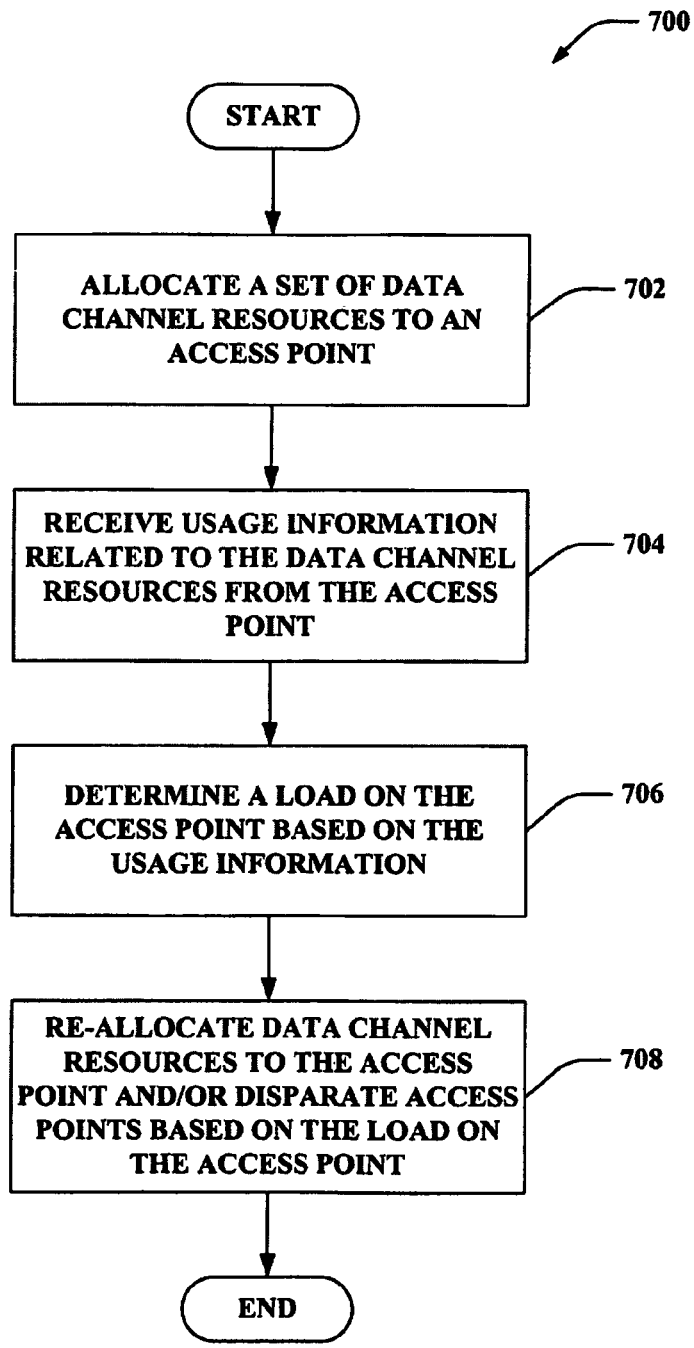
FIG. 7 is an illustration of an example methodology that facilitates allocating resources to access points based on received channel usage information.

Referring to FIGS. 5-7, methodologies relating to reporting channel usage information to a network controller for channel resource re-allocation are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates reporting channel usage information in a wireless network is displayed. At 502, a set of data channel resources can be received from a network controller. As described, the network controller can relate to a plurality of access points and can provide data channel resources allowing the access points to provide network access to one or more devices. At 504, a portion of the data channel resources can be allocated to one or more devices. Thus, the devices can attain network access using the data channel resources. In one example, the data channel resources can be granted based on requests received from the devices over a shared access channel, such as a RACH. In addition, the data channel resources can relate to E-DCH/EUL resources.

At 506, a usage report can be generated corresponding to allocation of the data channel resources. The report can comprise one or more metrics related to data channel resource allocation among the devices. For example, as described, the usage report can include a number of data channel resources granted to the devices in a given access frame (as related to an AICH/E-AICH, in one example). In addition, the usage report can include a number of system acquisition requests received over the RACH for which resources were denied, as described. At 508, the usage report can be transmitted to the network controller, for example, for further processing.

Turning to FIG. 6, illustrated is a methodology 600 that facilitates providing channel usage information to a network controller. At 602, system acquisition requests are received from one or more devices over a RACH. At 604, data channel resources are allocated to some devices based on the acquisition request. For example, as described, some devices can be denied data channel resources in relation to a system acquisition request. This can occur for a variety of reasons, for example, including availability of data channel resources, network loading, device-based parameters such as manufacturer, access provider, bandwidth capabilities, and/or the like. At 606, a number of resources allocated to the devices can be determined. This can relate to explicit grants of data channel resources in response to a system acquisition request. Further, at 608, a number of denied system acquisition requests can be determined. At 610, the number of allocated resources and denied requests can be transmitted to the network controller. As described, this information can be utilized by the network controller to re-allocate resources where desired.

Referring to FIG. 7, a methodology 700 is shown that facilitates allocating data channel resources according to received channel usage information. At 702, a set of data channel resources can be allocated to an access point. The data channel resources, as described, can allow the access point to provide wireless network access to one or more devices. At 704, usage information related to the data channel resources can be received from the access point. As described, the usage information can include a number of resources granted to one or more mobile device, a number of denied requests, and/or the like. At 706, a load on the access point can be determined based on the usage information. For example, the usage information can be utilized, as described, to determine how close to capacity the access point is regarding allocated channel resources. At 708, data channel resources can be re-allocated to the access point and/or disparate access points based on the load on the access point. Thus, where the load indicates the access point can use more resources to adequately support devices in the network, additional resources can be so allocated and can be moved from disparate access points, in one example.

It will be appreciated that, in accordance with one or more aspects described herein, inferences can be made regarding determining load on an access point and/or need for additional resources based on provided usage information, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
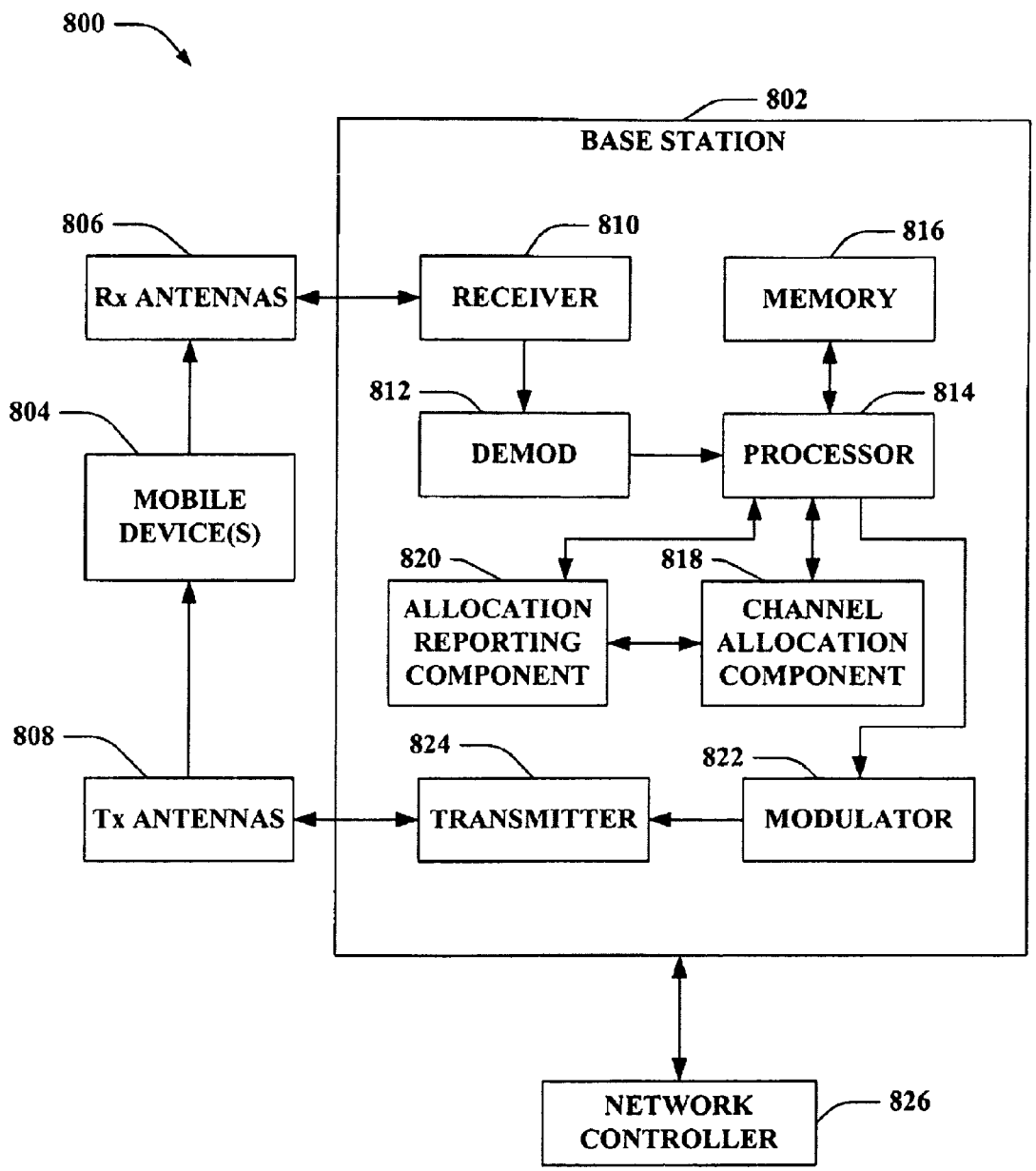
FIG. 8 is an illustration of an example system that allocates resources based on channel usage information.

FIG. 8 is an illustration of a system 800 that facilitates providing channel usage information to a network controller for resource allocation in a wireless network. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and demodulator 812 can demodulate received signals. Processor 814 can be a processor dedicated to analyzing information received by receiver 810 and/or generating information for transmission by a transmitter 824, and/or a processor that controls one or more components of the base station 802. The base station 802 is coupled to a network controller 826 that can provide data channel resources and/or other resources, to the base station 802 that facilitate providing mobile devices 804 with access to a wireless network.

Base station 802 can additionally comprise memory 816 that is operatively coupled to processor 814 and that can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with estimating and/or utilizing a channel (e.g., performance based, capacity based, etc.).

It will be appreciated that the data store (e.g., memory 816) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 816 of the subject systems and methods is intended to comprise, without being limited to, these and any other suitable types of memory Processor 814 is further coupled to a channel allocation component 818 that provides data channels to the mobile device(s) 804 and an allocation reporting component 820 that transmits channel usage information to the network controller 826. According to an example, the base station 802 can receive data channel resources from the network controller 826, and the channel allocation component 818 can allocate a portion of the resources to mobile device(s) 804 based on received system acquisition requests. Channel allocation component 818 can also deny requests for system acquisition received from one or more of the mobile device(s) 804, for example. The allocation reporting component 820 can generate channel usage information based on resources allocated and/or requests denied by the channel allocation component 818. The allocation reporting component 820 can transmit the usage information to the network controller 826 to facilitate resource re-allocation where necessary. In addition, the allocation reporting component 820 can generate other metrics, as described above. Furthermore, although depicted as being separate from the processor 814, it is to be appreciated that the demodulator 812, channel allocation component 818, allocation reporting component 820, and/or modulator 822 can be part of the processor 814 or multiple processors (not shown).

Figure 9:
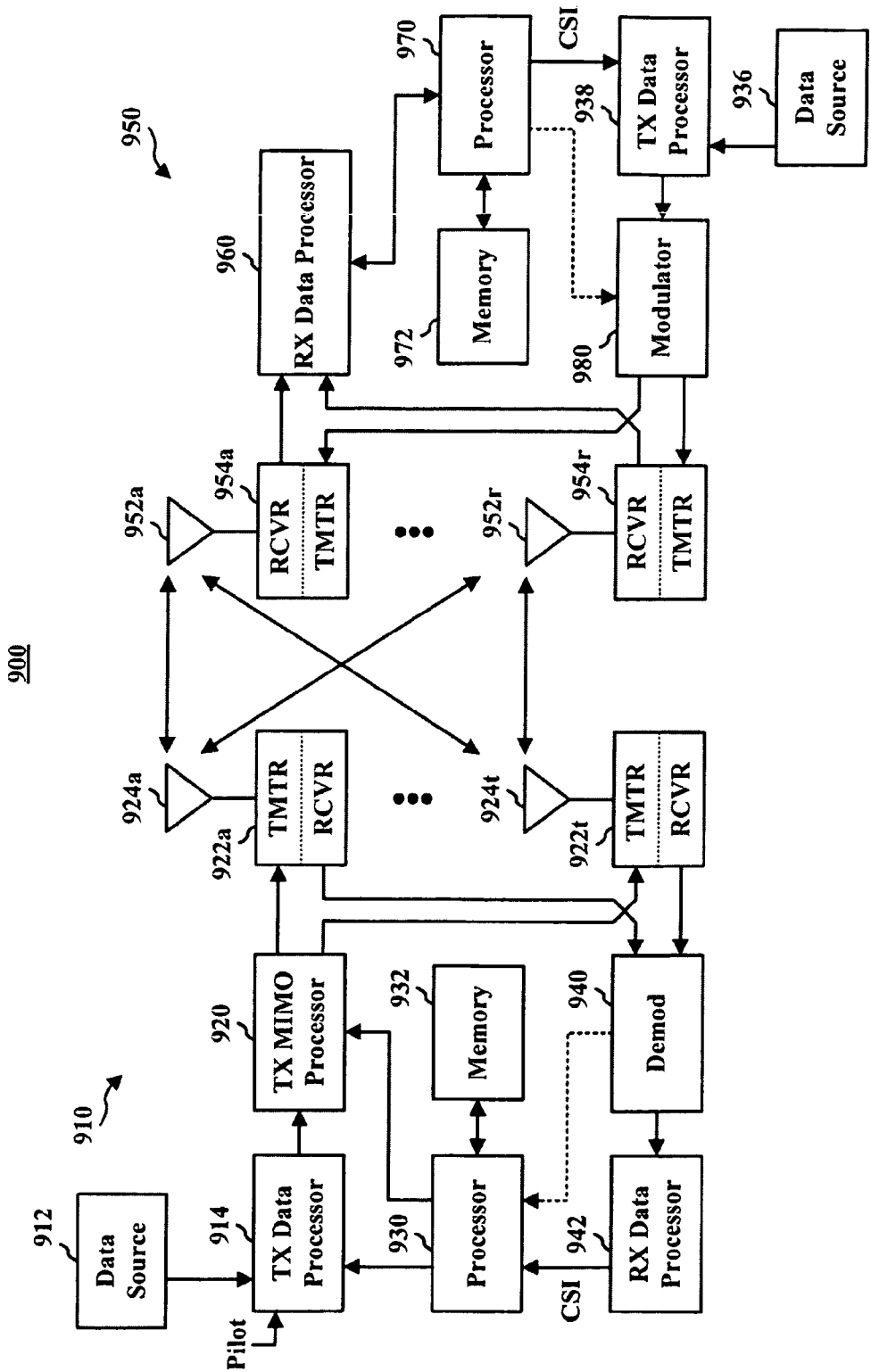
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 8) and/or methods (FIGS. 5-7) described herein to facilitate wireless communication there between.

At base station 910, traffic data for a number of data streams is provided from a data source 912 to a transmit (TX)

data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., BPSK, QPSK, M-PSK, M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
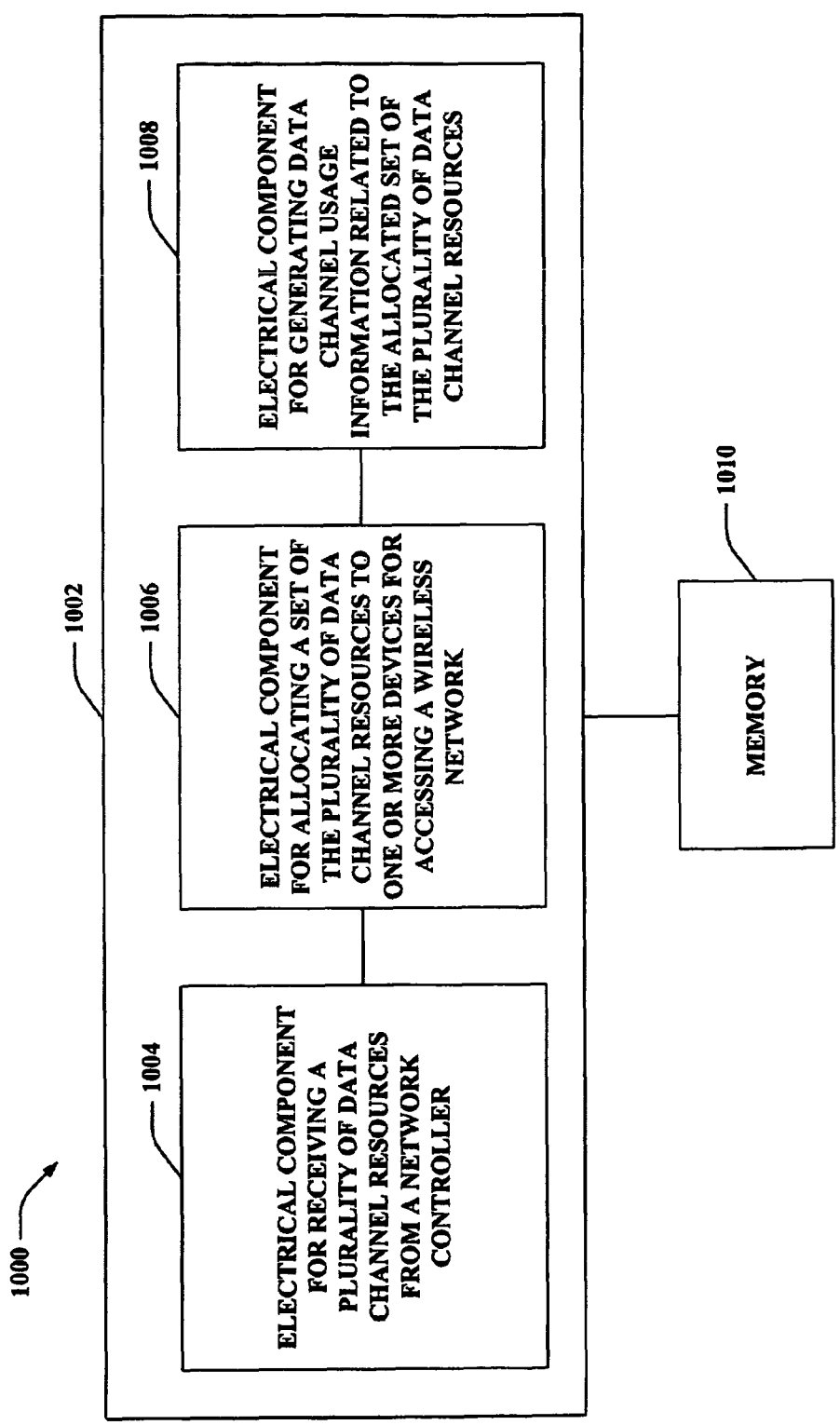
FIG. 10 is an illustration of an example system that generates a usage report related to data channel resources in a wireless network.

With reference to FIG. 10, illustrated is a system 1000 that generates usage information for a collection of data resources. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a plurality of data channel resources from a network controller 1004. As described, the data channel resources can facilitate providing access to a wireless network through the network controller. In addition, the network controller can support a plurality of access points allocating resources among the access points.

Further, logical grouping 1002 can comprise an electrical component for allocating a set of the plurality of data channel resources to one or more devices for accessing a wireless network 1006. The data channel resources can be allocated to the devices based on acquisition requests received from the devices; in addition, one or more acquisition requests can be denied, for example. Furthermore, logical grouping 1002 can include an electrical component for generating data channel usage information related to the allocated set of the plurality of data channel resources 1008. In addition, as described, the usage information can include a number of denied acquisition requests, a length of time of total or default channel allocation, rise in noise due to the channels, and/or the like, as described. In addition, the usage information can be transmitted to a network controller to receive re-allocation of the data channel resources, in one example. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
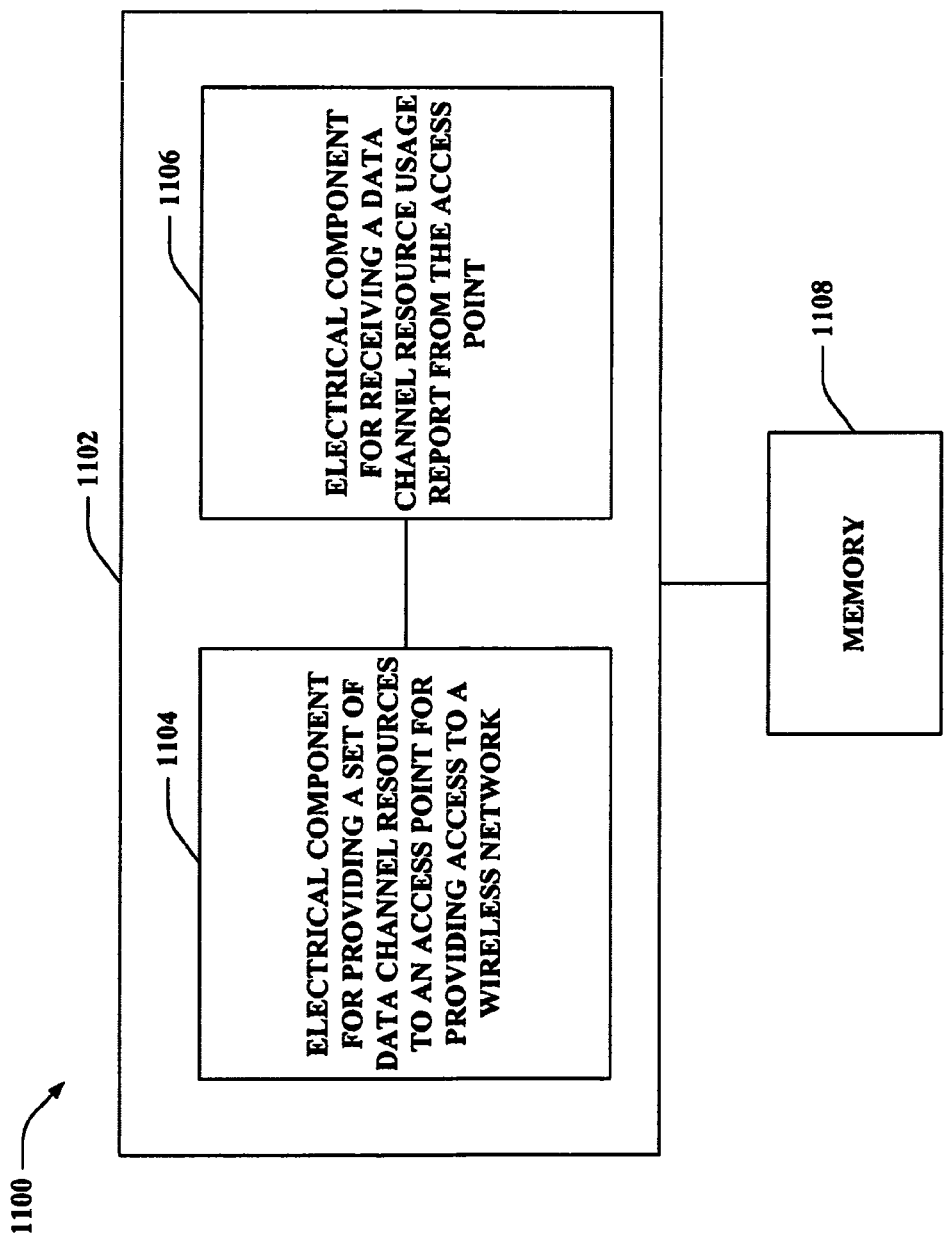
FIG. 11 is an illustration of an example system that facilitates allocating data channel resources to access points based on channel usage information.

Turning to FIG. 11, illustrated is a system 1100 that provides channel resource re-allocation based on received usage information. System 1100 can reside within a network component, such as a radio network controller, etc., for instance. As depicted, system 1100 includes functional blocks that can represent functions implemented by a processor, software, or combination thereof (e.g., firmware). System 1100 includes a logical grouping 1102 of electrical components that facilitate allocating data channel resources to a plurality of access points. Logical grouping 1102 can include an electrical component for providing a set of data channel resources to an access point for providing access to a wireless network 1104. As described, the data channel resources can, in turn, be allocated from the access point to one or more devices for providing wireless network access. Moreover, logical grouping 1102 can include an electrical component for receiving a data channel resource usage report from the access point 1106. In an example, the electrical component for providing 1104 allocates additional data channel resources to the access point based at least in part on the data channel resource usage report. Thus, for example, if the usage report indicates a number of granted resources close to, at, or exceeding capacity of the access point, more resources can be allocated to the access point. Additionally, system 1100 can include a memory 1108 that retains instructions for executing functions associated with electrical components 1104 and 1106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for reporting channel usage information to a network controller, comprising:
   receiving a set of data channel resources from a network controller related to accessing a wireless network, wherein the set of data channel resources relate to a set of enhanced dedicated channel (E-DCH) or enhanced uplink (EUL) resources;
   allocating one or more of the data channel resources to one or more devices to facilitate accessing the wireless network;
   generating usage information related to the set of data channel resources, the usage information comprising allocation information for the set of data channel resources, the allocation information comprising a number of allocations of at least one of the set of data channel resources and a number of denied requests for allocation of at least one of the set of data channel resources;
   reporting the usage information to the network controller;
   receiving an additional set of data channel resources from the network controller based on the reported usage information;
   receiving a plurality of system acquisition requests from one or more disparate mobile devices; and
   allocating the additional set of data channel resources to the one or more disparate mobile devices based on the system acquisition requests.

2. The method of claim 1, wherein the allocation information includes a number of data channel resources allocated to the one or more devices.

3. The method of claim 1, wherein the plurality of system acquisition requests are received over a provided shared access channel.

4. The method of claim 1, wherein the allocation information includes a number of allocations or denied requests related to one of the one or more data channel resources.

5. The method of claim 1, further comprising reporting allocation of the one or more data channel resources over an acquisition indicator channel (AICH) or extended AICH (E-AICH).

6. The method of claim 1, wherein generating usage information includes reporting allocation of the one or more data channel resources based at least in part on a load related to the one or more data channel resources or measured rise over thermal caused by the one or more data channel resources.

7. The method of claim 1, wherein the usage information comprises a length of time of allocation of a total of the set of data channel resources or a length of time of allocation of a default of the set of data channel resources.

8. The method of claim 1, wherein the number of allocations of the at least one of the set of data channel resources comprises a number of allocations of the at least one of the set of data channel resources in a given access frame.

9. The method of claim 1, wherein the reporting is performed in response to an expiration of a timer.

10. The method of claim 9, wherein the timer begins based on a detected event.

11. The method of claim 9, wherein the timer counts over a fixed period of time.

12. A wireless communications apparatus, comprising:
   at least one processor configured to:
      receive a set of data channel resources from a network controller for accessing a wireless network, wherein the set of data channel resources relate to a set of enhanced dedicated channel (E-DCH) or enhanced uplink (EUL) resources;
      provide a portion of the set of data channel resources to one or more devices to facilitate accessing the wireless network;
      report channel usage information related to the portion of the set of data channel resources to the network controller, the channel usage information comprising allocation information for the set of data channel resources, the allocation information comprising a number of allocations of at least one of the set of data channel resources and a number of denied requests for allocation of at least one of the set of data channel resources; and
   a memory coupled to the at least one processor;
      report the usage information to the network controller;
      receive an additional set of data channel resources from the network controller based on the reported usage information;
      receive a plurality of system acquisition requests from one or more disparate mobile devices; and
      allocate the additional set of data channel resources to the one or more disparate mobile devices based on the system acquisition requests.

13. A wireless communications apparatus that facilitates reporting data channel usage information, comprising:
   means for receiving a plurality of data channel resources from a network controller, wherein the set of data channel resources relate to a set of enhanced dedicated channel (E-DCH) or enhanced uplink (EUL) resources;
   means for allocating a set of the plurality of data channel resources to one or more devices for accessing a wireless network;
   means for generating data channel usage information related to the allocated set of the plurality of data channel resources, the data channel usage information comprising allocation information for the plurality of data channel resources, the allocation information comprising a number of allocations of at least one of the plurality of data channel resources and a number of denied requests for allocation of at least one of the plurality of data channel resources;
   means for reporting the usage information to the network controller;
   means for receiving an additional set of data channel resources from the network controller based on the reported usage information;
   means for receiving a plurality of system acquisition requests from one or more disparate mobile devices; and
   means for allocating the additional set of data channel resources to the one or more disparate mobile devices based on the system acquisition requests.

14. A non-transitory computer-readable medium comprising:
   code for causing at least one computer to receive a set of data channel resources from a network controller related to accessing a wireless network, wherein the set of data channel resources relate to a set of enhanced dedicated channel (E-DCH) or enhanced uplink (EUL) resources;
   code for causing the at least one computer to allocate one or more of the data channel resources to one or more devices to facilitate accessing the wireless network;
   code for causing the at least one computer to generate usage information related to the set of data channel resources, the usage information comprising allocation information for the set of data channel resources, the allocation information comprising a number of allocations of at least one of the set of data channel resources number of denied requests for allocation of at least one of the set of data channel resources;
code for reporting the usage information to the network controller;
code for receiving an additional set of data channel resources from the network controller based on the reported usage information;
code for receiving a plurality of system acquisition requests from one or more disparate mobile devices; and
code for allocating the additional set of data channel resources to the one or more disparate mobile devices based on the system acquisition requests.

15. An apparatus, comprising:
an acquisition request component that receives system acquisition requests from one or more devices in a wireless network;
a channel allocation component that provides one or more data channel resources received from a network controller to the one or more devices based on the system acquisition requests; and
a channel allocation reporting component that generates channel usage information based at least in part on the data channel resources received from the network controller, the channel usage information comprising allocation information for the one or more data channel resources, the allocation information comprising a number of allocations of at least one of the one or more data channel resources and a number of denied requests for allocation of at least one of the one or more data channel resources, where in the channel allocation reporting component further transmits the channel usage information to the network controller;
wherein the apparatus receives additional data channel resources from the network controller based on the channel usage information, and wherein the channel allocation reporting component further reports allocation of the one or more data channel resources over an acquisition indicator channel (AICH) or extended AICH (E-AICH).

16. The apparatus of claim 15, wherein the allocation information relates to a number of data channel resources provided to the one or more devices by the channel allocation component.

17. The apparatus of claim 15, wherein the channel allocation component denies one or more of the system acquisition requests.

18. The apparatus of claim 17, wherein the allocation information includes a number of denied system acquisition requests.

19. The apparatus of claim 15, wherein the system acquisition requests are received over a shared access channel provided by the apparatus.

20. The apparatus of claim 15, wherein the allocation information includes a number of allocations or denied requests related to one of the one or more data channel resources.

21. The apparatus of claim 15, wherein the channel allocation reporting component further reports allocation of the one or more data channel resources based at least in part on a load related to the one or more data channel resources or measured rise over thermal caused by the one or more data channel resources.

22. A method that facilitates allocating channel resources to access points in a wireless communications network, comprising:
allocating a set of data channel resources, for providing access to a wireless network, to an access point, wherein the set of data channel resources relate to a set of enhanced dedicated channel (E-DCH) or enhanced uplink (EUL) resources;
receiving usage information from the access point related to the set of data channel resources, the usage information comprising allocation information for the set of data channel resources, the allocation information comprising a number of allocations of at least one of the set of data channel resources and a number of denied requests for allocation of at least one of the set of data channel resources; and
adjusting allocation of the set of data channel resources to the access point based at least in part on the usage information.

23. The method of claim 22, wherein the allocation information includes a number of data channel resources in the set that the access point granted to one or more devices.

24. The method of claim 23, wherein the allocation information includes a number of denied system acquisition requests provided to one or more devices by the access point.

25. The method of claim 24, further comprising determining a data channel resource capacity based at least in part on a ratio of granted data channel resources to denied system acquisition requests, wherein the allocation of the set is adjusted based on the ratio.

26. The method of claim 22, further comprising determining a data channel resource capacity based at least in part on the granted data channel resources and the number of allocated data channel resources in the set, wherein the allocation of the set is adjusted based on the determined data channel resource capacity.

27. The method of claim 22, further comprising adjusting allocation of a disparate set of data channel resources to a disparate access point based at least in part on the usage information.

28. A wireless communications apparatus, comprising:
at least one processor configured to:
provide a plurality of data channel resources to one or more access points to facilitate providing access to a wireless network, wherein the plurality of data channel resources relate to a set of enhanced dedicated channel (E-DCH) or enhanced uplink (EUL) resources;
receive usage information related to one or more of the data channel resources granted to one or more devices by the one or more access points, the usage information comprising allocation information for the plurality of data channel resources, the allocation information comprising a number of allocations of at least one of the plurality of data channel resources and a number of denied requests for allocation of at least one of the plurality of data channel resources; and
provide additional data channel resources to the one or more access points based at least in part on the usage information; and a memory coupled to the at least one processor.

29. A wireless communications apparatus that allocates data channel resources based on related usage information, comprising:
means for providing a set of data channel resources to an access point for providing access to a wireless network, wherein the set of data channel resources relate to a set of enhanced dedicated channel (E-DCH) or enhanced uplink (EUL) resources; and
means for receiving a data channel resource usage report from the access point, the data channel resource usage report comprising allocation information for the set of data channel resources, the allocation information comprising a number of allocations of at least one of the set of data channel resources and/or a number of denied requests for allocation of at least one of the set of data channel resources, wherein the means for providing allocates additional data channel resources to the access point based at least in part on the data channel resource usage report.

30. A non-transitory computer-readable medium comprising:
code for causing at least one computer to allocate a set of data channel resources, for providing access to a wireless network, to an access point, wherein the set of data channel resources relate to a set of enhanced dedicated channel (E-DCH) or enhanced uplink (EUL) resources;
code for causing the at least one computer to receive usage information from the access point related to the set of data channel resources, the usage information comprising allocation information for the set of data channel resources, the allocation information comprising a number of allocations of at least one of the set of data channel resources and/or a number of denied requests for allocation of at least one of the set of data channel resources; and
code for causing the at least one computer to adjust allocation of the set of data channel resources to the access point based at least in part on the usage information.

31. An apparatus, comprising:
an allocation adjustment component that allocates a plurality of data channel resources to an access point, wherein the set of data channel resources relate to a set of enhanced dedicated channel (E-DCH) or enhanced uplink (EUL) resources; and
a report receiving component that obtains usage information related to a number of the plurality of data channel resources granted to devices in a wireless network by the access point, the usage information comprising allocation information for the plurality of data channel resources, the allocation information comprising a number of allocations of at least one of the plurality of data channel resources and/or a number of denied requests for allocation of at least one of the plurality of data channel resources,
wherein the allocation adjustment component modifies allocation of the plurality of data channel resources to the access point based on the usage information.

32. The apparatus of claim 31, wherein the allocation information includes a number of denied system acquisition requests corresponding to one or more of the devices by the access point.

33. The apparatus of claim 32, wherein the report receiving component determines a data channel resource capacity based at least in part on a ratio of granted data channel resources to denied system acquisition requests, wherein the allocation adjustment component modifies the allocation based on the ratio.

34. The apparatus of claim 31, wherein the allocation adjustment component modifies allocation of a plurality of disparate data channel resources to a disparate access point based on the usage information.

35. The apparatus of claim 34, wherein the allocation adjustment component allocates one or more of the disparate data channel resources from the disparate access point to the access point.

* * * * *